(12) United States Patent
Takagi

(10) Patent No.: US 12,220,997 B2
(45) Date of Patent: Feb. 11, 2025

(54) CHARGING CONNECTOR

(71) Applicant: Japan Aviation Electronics Industry, Limited, Tokyo (JP)

(72) Inventor: Youhei Takagi, Irvine, CA (US)

(73) Assignee: Japan Aviation Electronics Industry, Limited, Tokyo (JP)

( * ) Notice: Subject to any disclaimer, the term of this patent is extended or adjusted under 35 U.S.C. 154(b) by 498 days.

(21) Appl. No.: 17/589,995

(22) Filed: Feb. 1, 2022

(65) Prior Publication Data

US 2023/0020408 A1    Jan. 19, 2023

Related U.S. Application Data

(60) Provisional application No. 63/222,018, filed on Jul. 15, 2021.

(51) Int. Cl.
| | | |
|---|---|---|
| *H01R 13/512* | (2006.01) | |
| *B60L 53/16* | (2019.01) | |
| *H01R 13/10* | (2006.01) | |
| *H01R 13/502* | (2006.01) | |
| *H01R 13/629* | (2006.01) | |

(52) U.S. Cl.
CPC .............. *B60L 53/16* (2019.02); *H01R 13/10* (2013.01); *H01R 13/502* (2013.01); *H01R 13/629* (2013.01); *H01R 2201/26* (2013.01)

(58) Field of Classification Search
CPC ....... B60L 53/16; H01R 13/10; H01R 13/502; H01R 13/629; H01R 2201/26; H01R 13/512; H01R 13/02
See application file for complete search history.

(56) References Cited

U.S. PATENT DOCUMENTS

| | | | | |
|---|---|---|---|---|
| 5,947,766 | A * | 9/1999 | Tsuji | H01R 13/748 |
| | | | | 439/564 |
| 9,531,103 | B2 * | 12/2016 | Fujita | B60L 53/18 |
| 10,340,623 | B2 | 7/2019 | Beimdieck et al. | |
| 10,644,433 | B2 | 5/2020 | Fuehrer | |
| 10,931,061 | B2 * | 2/2021 | Götz | H01R 13/502 |
| 10,994,626 | B2 * | 5/2021 | Reber | H01R 13/42 |
| 2021/0257781 | A1 * | 8/2021 | Takagi | H01R 13/639 |

FOREIGN PATENT DOCUMENTS

| | | |
|---|---|---|
| JP | H06-333633 A | 12/1994 |
| JP | 2015-082340 A | 4/2015 |
| JP | 2018-163876 A | 10/2018 |

* cited by examiner

*Primary Examiner* — Nghia M Doan
(74) *Attorney, Agent, or Firm* — Collard & Roe, P.C.

(57) ABSTRACT

A charging connector is provided with a mating portion, a main portion, a body and a fasting member. The main portion is provided with a plurality of contacts, which are respectively connectable mating contacts of a mating connector, and a housing, which holds the contacts. The body accommodates the main portion at least in part and holds the main portion. The mating portion is located forward of the body in a front-rear direction. The fasting member fastens the mating portion to the body. The fasting member is not brought into contact with the housing at least in the front-rear direction.

8 Claims, 11 Drawing Sheets

CHARGING CONNECTOR

CROSS REFERENCE TO RELATED APPLICATIONS

This application is a non-provisional application that hereby claims priority under 35 U.S.C. 119 (e) from U.S. Provisional Patent Application Ser. No. 63/222,018 filed on Jul. 15, 2021, the disclosure of which is incorporated herein by reference.

BACKGROUND ART

This invention relates to a charging connector, particularly to a structure of the charging connector.

Patent document 1 discloses an example of a charging connector.

As shown in FIG. 18, a charging connector 90 of Patent Document 1 has a body 92 and a contact support 94. The body 92 has contact elements 921. Moreover, the body 92 is connected to a cable 98. The contact support 94 is fixed to the body 92 with screws (not shown). The contact support 94 functions as a mating portion which is mated with a mating connector (not shown). According to this structure, replacement of the contact support 94 can be easily performed.
Patent Document 1: JP2018-163876A

DISCLOSURE OF INVENTION

The charging connector of this type might be damaged by its weight when it is accidentally dropped. In particular, there is a high possibility that the mating portion which is a tip part of the charging connector directly bump into a floor or the ground when the charging connector is dropped.

In the charging connector 90 of Patent document 1, it is unclear exactly how the contact support 94 and the body 92 are connected to each other. However, it is guessed that an impact added to the contact support 94 might be transmitted to the body 92 and might break internal structural elements, such as the contact element 921, of the body 92.

Accordingly, in a charging connector, it is desired that an influence of an impact of dropping on internal structural elements of a body is reduced.

It is therefore an object of the present invention to provide a charging connector which can reduce an influence of an impact, which a mating portion receives when dropped, on internal structural elements of a body.

One aspect of the present invention provides a charging connector which comprises a mating portion, a main portion, a body and a fastening member. In the charging connector, the main portion comprises a plurality of contacts, which are respectively connectable to mating contacts of a mating connector, and a housing, which holds the contacts. The body accommodates the main portion at least in part and holds the main body. The mating portion is located forward of the body in a front-rear direction. The fastening member fastens the mating portion to the body. The fastening member is not in contact with the housing at least in the front-rear direction.

In the charging connector, the housing is held by the body. Moreover, the mating portion is fastened to the body with the fastening member. The fastening member is not in contact with the housing at least in the front-rear direction. With this structure, it can be prevented or suppressed that an impact that the mating portion receives is directly transmitted to the housing.

An appreciation of the objectives of the present invention and a more complete understanding of its structure may be had by studying the following description of the preferred embodiment and by referring to the accompanying drawings.

Figure 1:
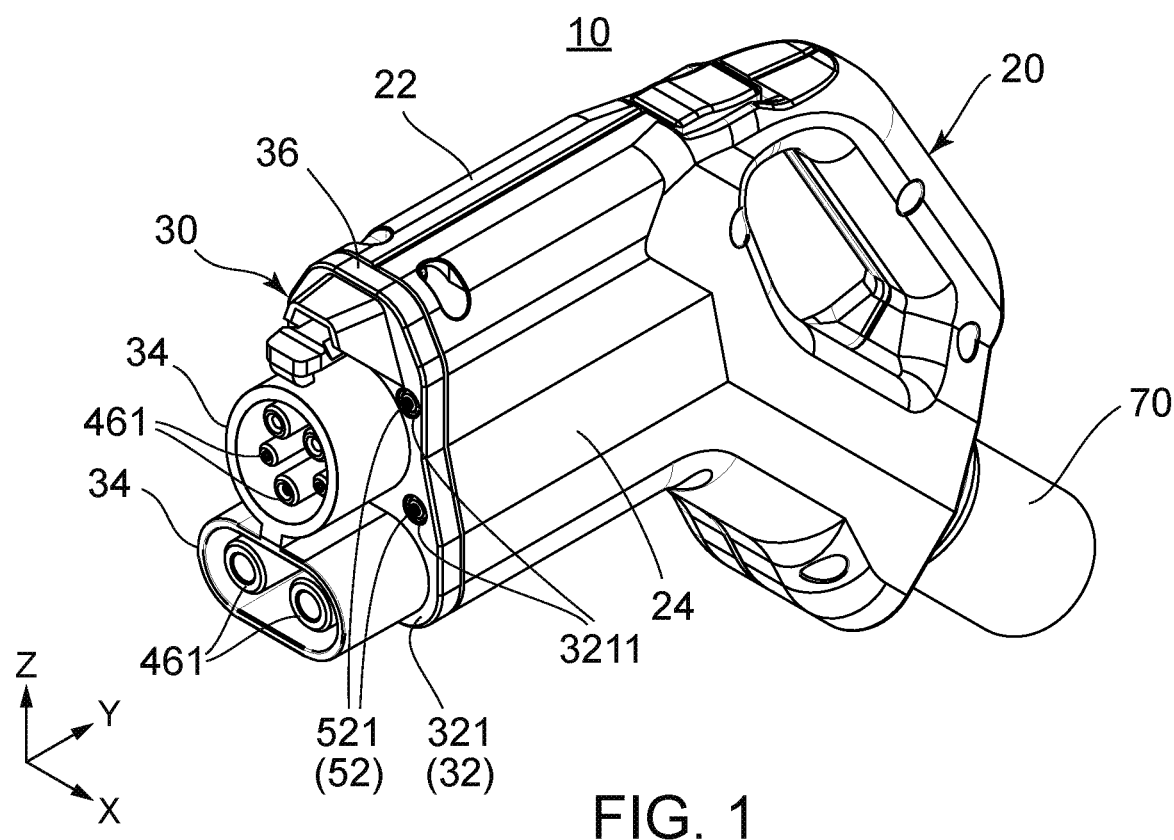
FIG. 1 is a front, perspective view showing a charging connector according to a first embodiment of the present invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DESCRIPTION OF PREFERRED EMBODIMENTS

First Embodiment

Referring to FIG. 1, a charging connector 10 according to a first embodiment of the present invention is provided with a body 20 and a mating portion 30. The mating portion 30 is located forward of the body 20 in a front-rear direction. In detail, the mating portion 30 is attached to a front-end portion of the body 20. In the present embodiment, the front-rear direction is a Y-direction. A negative Y-direction is directed forward while a positive Y-direction is directed to rearward.

Figure 2:
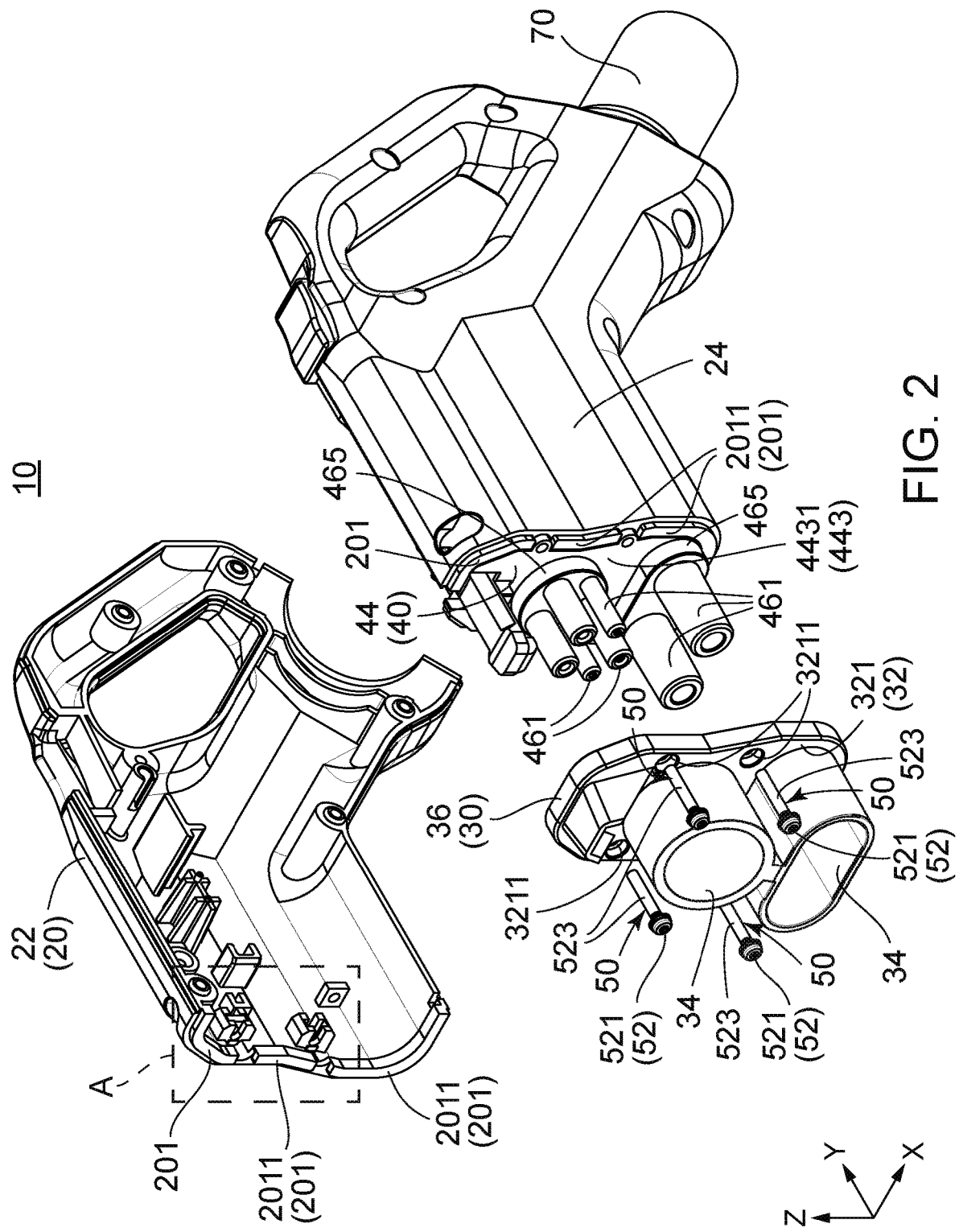
FIG. 2 is an exploded, front, perspective view showing the charging connector of FIG. 1. A main portion of the charging connector is held by a first body portion included in a body.
Figure 4:
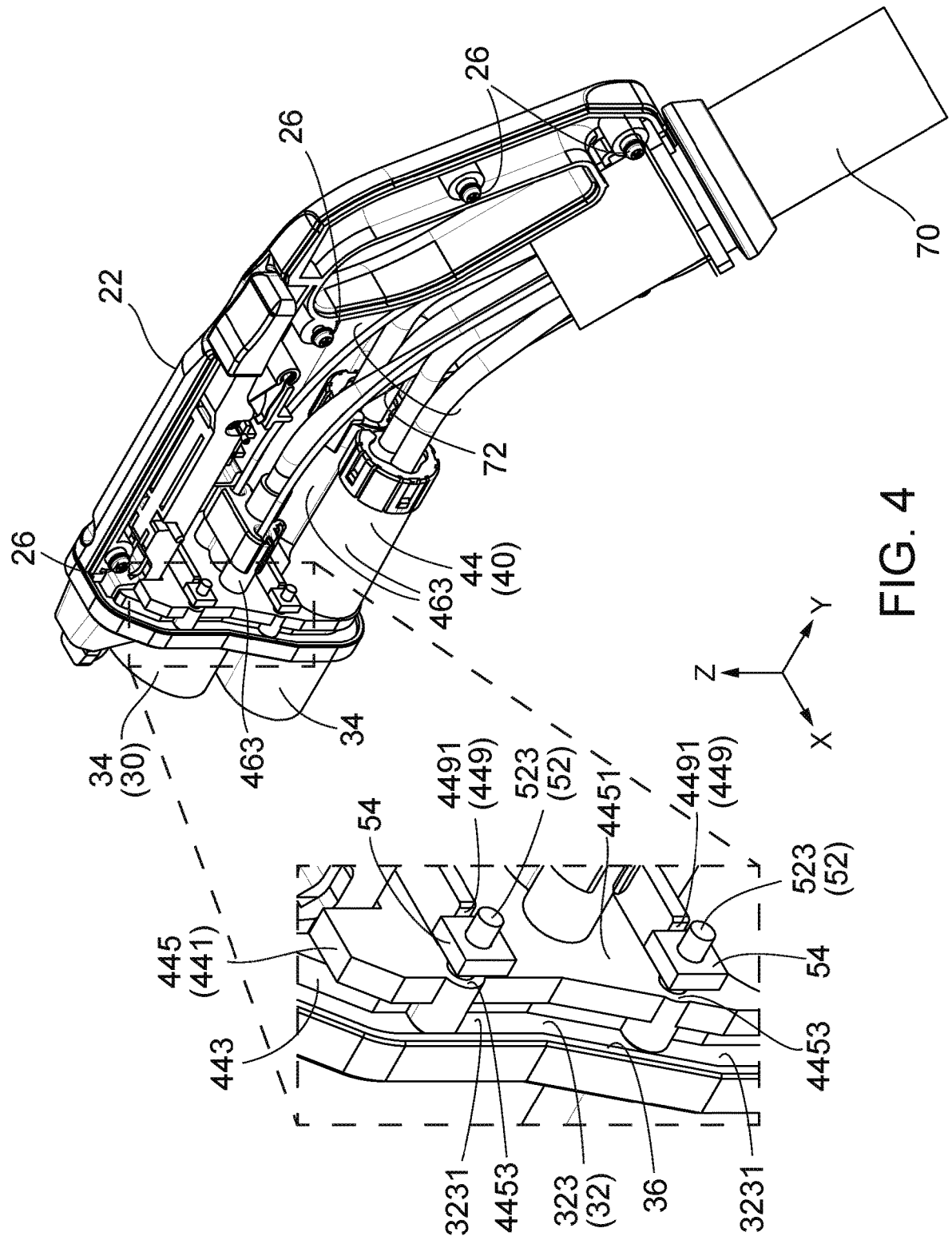
FIG. 4 is an exploded, rear, perspective view showing the charging connector of FIG. 1. The main portion of the charging connector is held by a second body included in the body. The first body included in the body is omitted.

As shown in FIGS. 2 and 4, the charging connector 10 is further provided with a main portion 40. The main portion 40 is connected to a plurality of electric wires 72 included in a cable 70. Moreover, the main portion 40 is accommodated in the body 20 in part.

Figure 5:
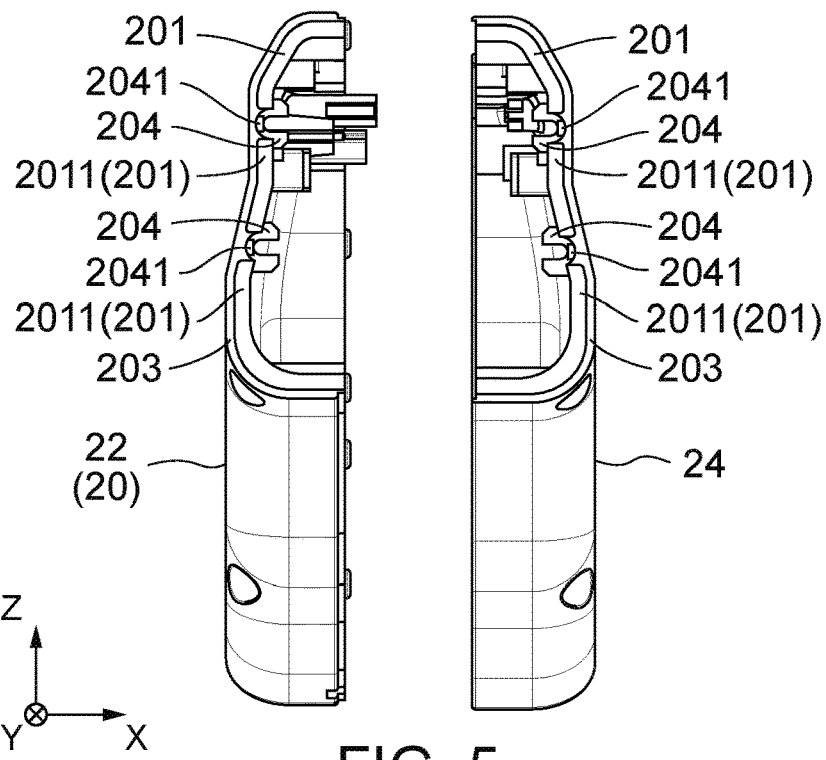
FIG. 5 is an exploded, front view showing the body included in the charging connector of FIG. 1.
Figure 6:
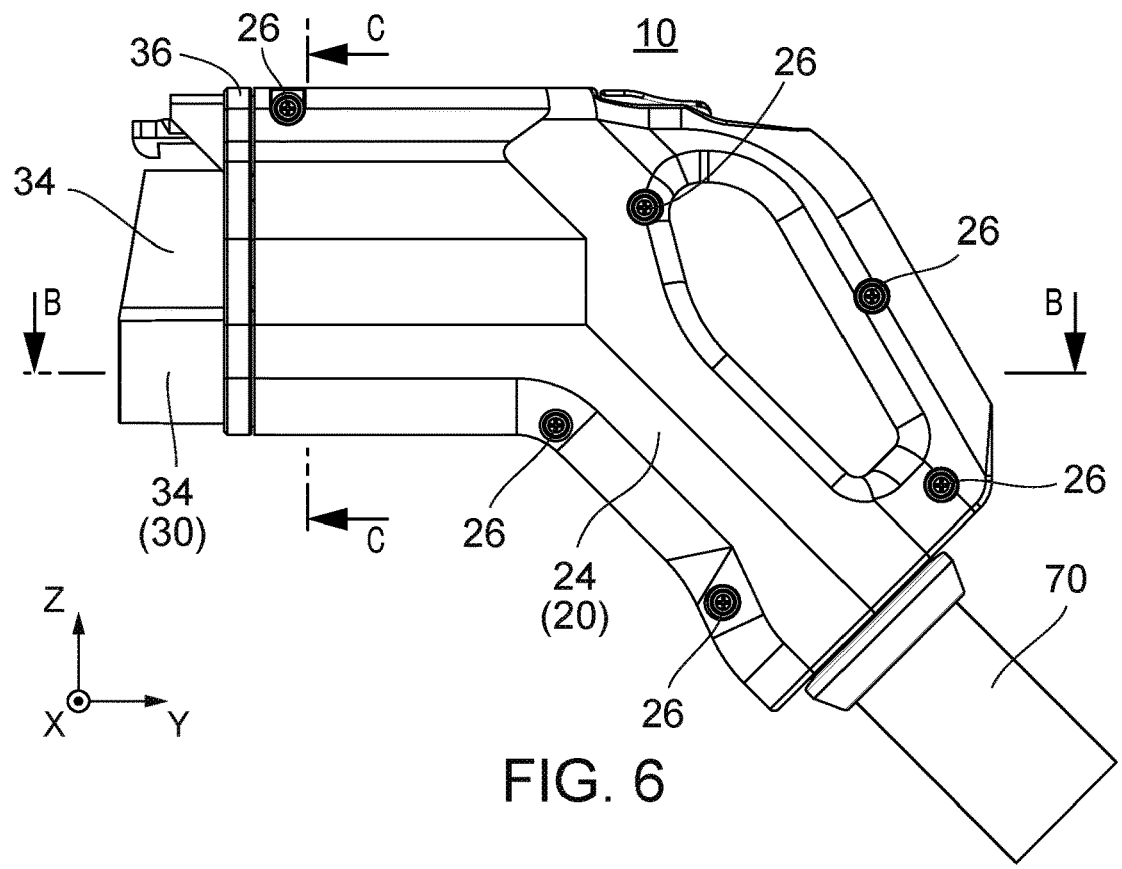
FIG. 6 is a side view showing the charging connector of FIG. 1.

As shown in FIGS. 2 and 5, the body 20 has a first body portion 22 and a second body portion 24 which are separatable from each other in a lateral direction perpendicular to the front-rear direction. In the present embodiment, the lateral direction is an X-direction. As understood from FIG. 6, the first body portion 22 and the second body portion 24 are fixed to each other by using a plurality of screws 26.

As understood from FIGS. 2 and 5, to the front-end portion of the body 20, a plurality of elongated protrusion portions 201 is provided. The elongated protrusion portions 201 protrude from a front surface 203 of the body 20 in the front-rear direction. Moreover, the elongated protrusion portions 201 are located inward of an outer edge of the front surface 203 of the body 20 in a plane perpendicular to the front-rear direction.

As understood from FIGS. 2 and 4, the body 20 accommodates the main portion 40 at least in part and holds the main portion 40. In the present embodiment, the body 20 accommodates the main portion 40 in part.

As shown in FIG. 2, the charging connector 10 is further provided with a plurality of fastening members 50 which fasten the mating portion 30 to the body 20. As understood from FIGS. 2 to 4, each of the fastening members 50 consists of a screw 52 and a nut 54. In the present embodiment, the fastening members 50 are four in number. However, the present invention is not limited thereto. The number of the fastening member 50 should be one at least.

Figure 3:
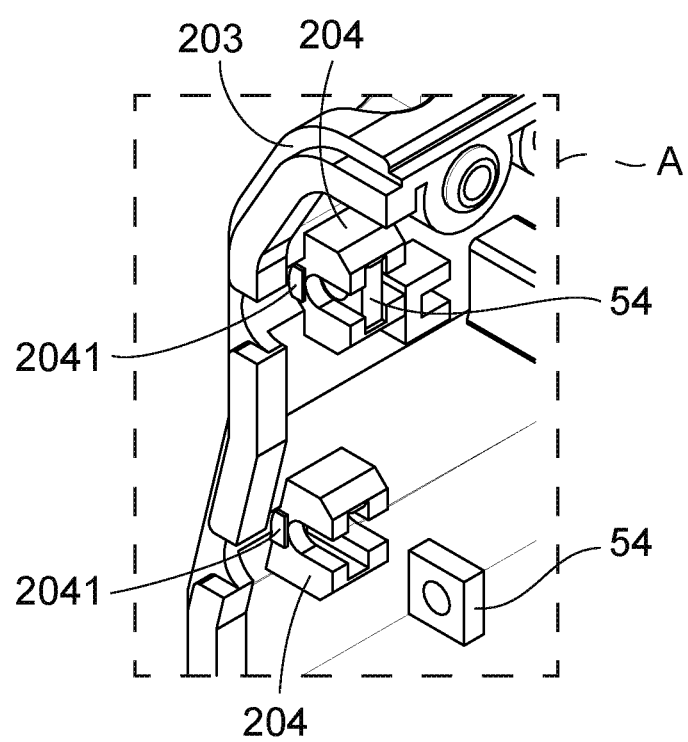
FIG. 3 is an expanded view showing an inner area of a dashed line A of FIG. 2.

As shown in FIG. 2, the screw 52 of the fastening member 50 has a head portion 521 and a shaft portion 523. In the present embodiment, the screw 52 is a pan head screw. Moreover, as shown in FIGS. 2 to 4, the nut 54 is a square nut having a square shape when viewed along the front-rear direction. However, the present invention is not limited thereto. The screw 52 may be a screw having a head portion of a different shape different from that of the pan head, for example, may be a truss head screw or the like. Moreover, the nut 54 may be a nut having a shape other than a square, for example, may be a rectangular nut. However, it is preferable that the nut 54 is not a ring nut or a hexagon nut from the point of view of turn prevention.

As shown in FIGS. 2, 3 and 5, the body 20 has a plurality of nut holding portions 204. The nut holding portions 204 are equal to the fastening members 50 in number. In the present embodiment the nut holding portions 204 are four in number. Each of the nut holding portions 204 has a nut accommodation portion which opens inward in the lateral direction. The nut 54 is inserted or press-fit into the nut accommodation portion and accommodated in the nut accommodation portion. Thus, the nuts 54 are held by the nut holding portions 204 or by the body 20. With regard to the nut 54 held by the nut holding portion 204, a front-rear movement, an outward movement in the lateral direction and a rotational movement about an axis along the front-rear direction are regulated.

Figure 7:
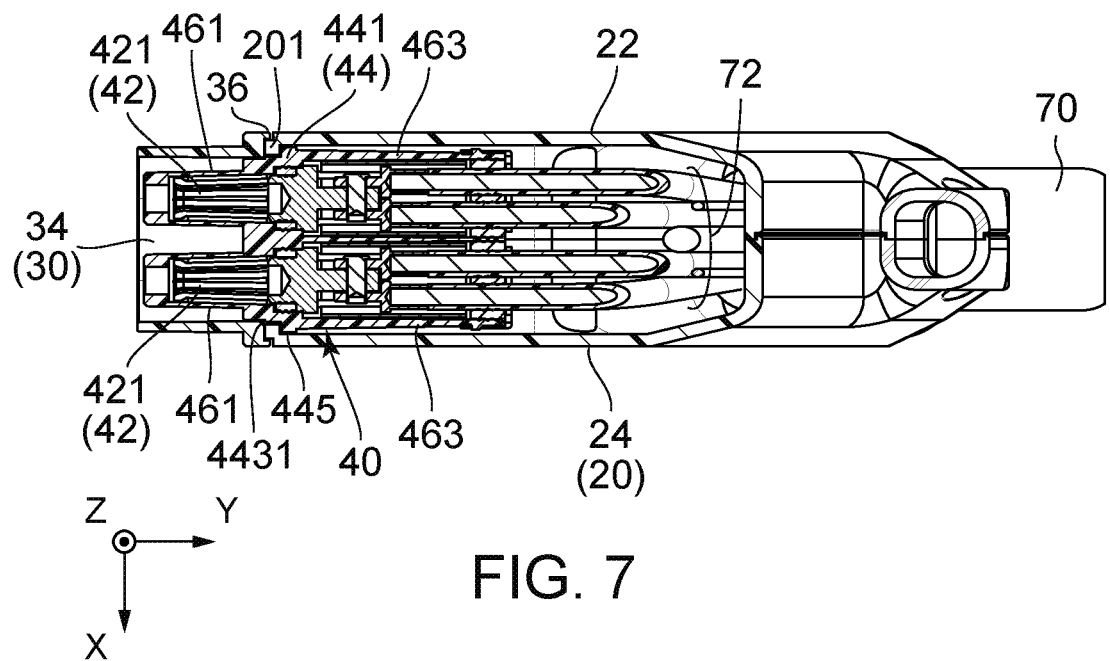
FIG. 7 is a cross-sectional view showing the charging connector of FIG. 6, taken along line B-B.
Figure 9:
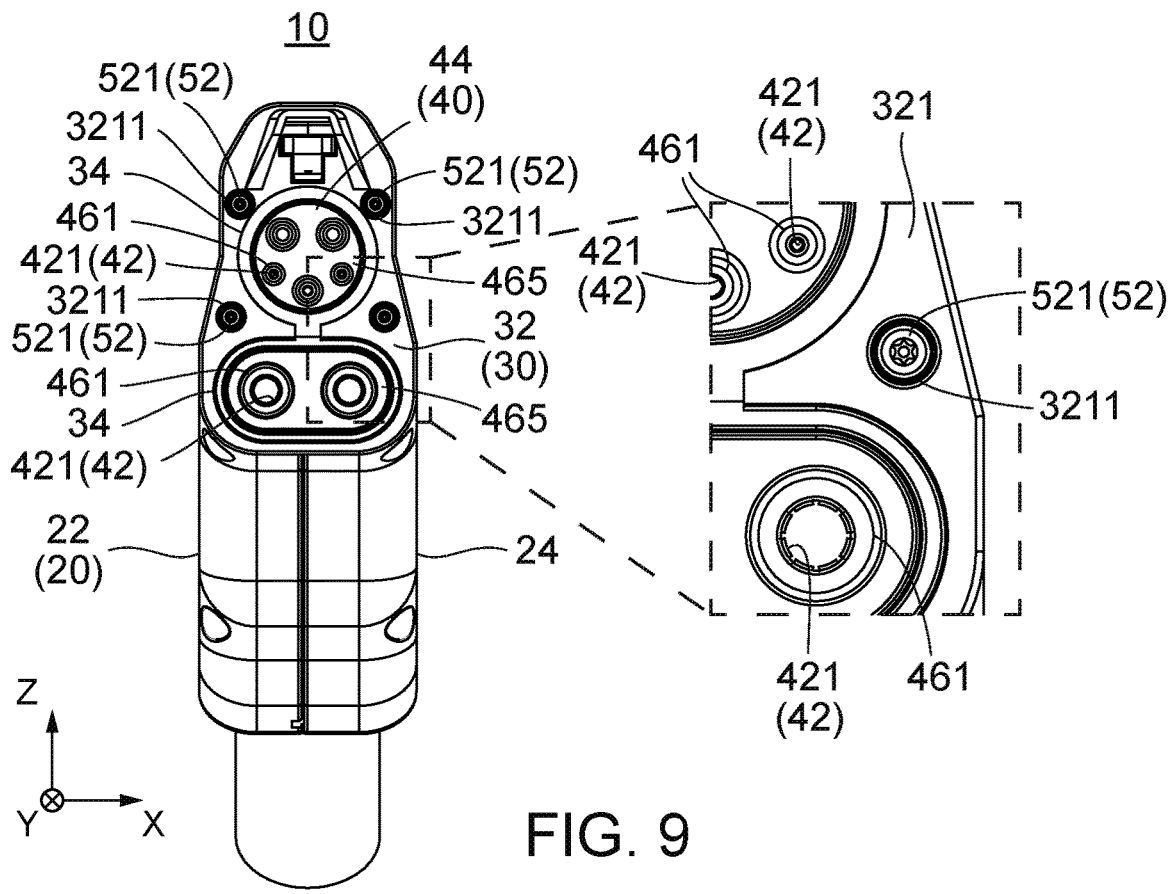
FIG. 9 is a front view showing the charging connector of FIG. 1.

As understood from FIGS. 7 and 9, the main portion 40 is provided with a plurality of contacts 42 and a housing 44 which holds the contacts 42. The contacts 42 include a plurality of contacts which have different purposes. In detail, the contacts 42 include signal contacts and power contacts. The contacts 42 having different purposes have shapes different from each other and sizes different from each other. However, the differences are not directly related to the present invention, and therefore the description thereof will be omitted.

As understood from FIGS. 4 and 7, each of the contacts 42 is connected to at least one of end portions of the electric wires 72 included in the cable 70. The contacts 42 correspond to mating contacts (not shown) provided by a mating connector (not shown), respectively. When the charging connector 10 and the mating connector are mated with each other, the contacts 42 are electrically connected to the mating contacts, respectively.

Figure 10:
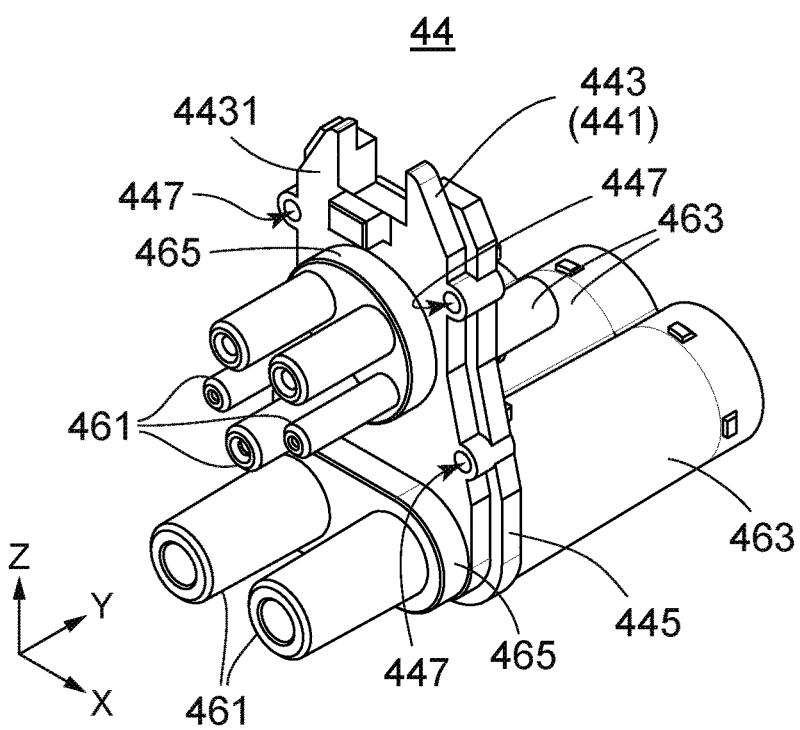
FIG. 10 is a front, perspective view showing a housing included in the main portion of the charging connector of FIG. 1.
Figure 11:
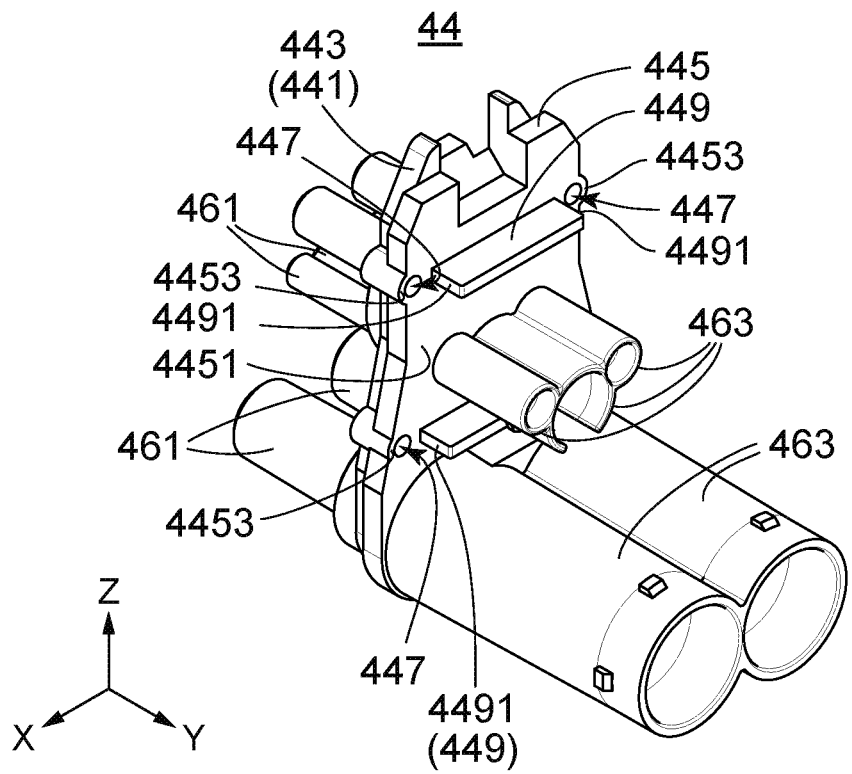
FIG. 11 is a rear, perspective view showing the housing of FIG. 10.

As shown in FIGS. 10 and 11, the housing 44 has a partition wall 441 with a main surface (a front surface) 4431, a plurality of covering portions 461 and a plurality of accommodation portions 463. The partition wall 441 has a front portion 443 and a rear portion 445 which are integrally formed. The front portion 443 is located forward of the rear portion 445 in the front-rear direction. Moreover, in the front-rear direction, the main surface 4431 is directed forward, and a rear surface 4451 of the rear portion 445 is directed rearward. In a plane perpendicular to the front-rear direction, the rear portion 445 protrudes outward of the front portion 443 except for parts thereof.

Figure 12:
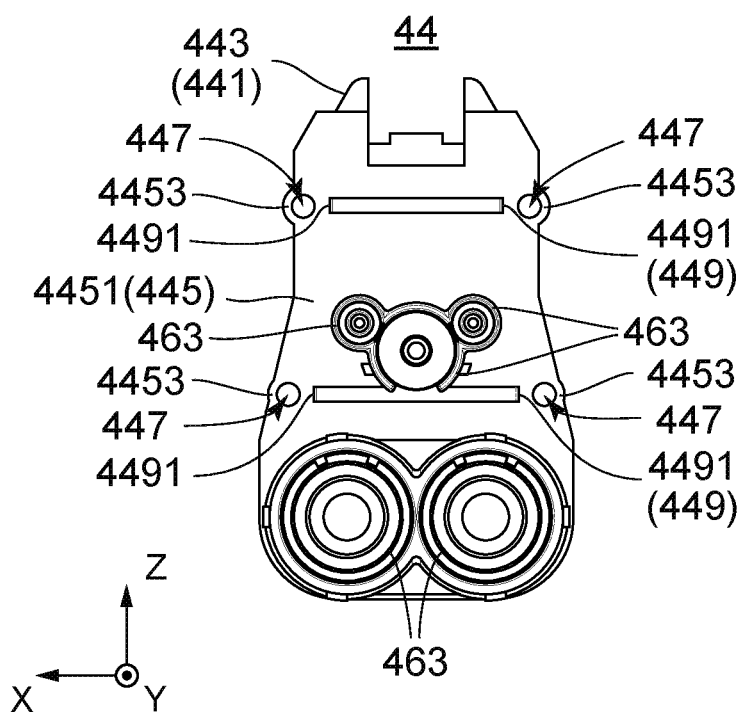
FIG. 12 is a rear view showing the housing of FIG. 11.

As shown in FIGS. 10 to 12, the partition wall 441 is formed with a plurality of holes 447 which pierce the partition wall 441 in the front-rear direction. The holes 447 correspond to the fastening members 50, respectively. The holes 447 are located near an edge portion of the partition wall 441. An internal diameter of each of the holes 447 is larger than an external diameter of the shaft 523 (see FIG. 2) of the screw 52 of the fastening member 50. Moreover, the internal diameter of the hole 447 is equal to or larger than that of a hole 325 of the mating portion 30 which is mentioned later.

As understood from FIG. 9, the covering portions 461 correspond to the contacts 42, respectively. Moreover, as understood from FIGS. 10 and 11, the covering portions 461 correspond to the accommodation portions 463, respectively. The covering portions 461 protrude forward from the main surface 4431 of the partition wall 441. In the present embodiment, the covering portions 461 have base portions 465. Each of the base portions 465 is shared among certain of the covering portions 461. However, the present invention is not limited thereto. The covering portions 461 may not have the base portions 465 and may be independent of one another. The accommodation portions 463 protrude rearward from the rear surface 4451 of the partition wall 441. In the front-rear direction, an internal space of the covering portion 461 and an internal space of the accommodation portion 463 corresponding to the covering portion 461 communicate with each other. Each of the accommodation portions 463 is joined with at least one of other accommodation portions 463. However, the present invention is not limited thereto. The accommodation portions 463 may be independent of one another.

As understood from FIGS. 11 and 12, the rear surface 4451 of the partition wall 441 is further provided with falling prevention portions 449 protruding rearward. Each of the falling prevention portions 449 has a plate-like shape extending in the lateral direction. The falling prevention portion 449 has side surfaces 4491 directed outward in the lateral direction. The side surfaces 4491 correspond to the holes 447, respectively. When viewed along the front-rear direction, each of the side surfaces 4491 faces the hole 447 corresponding thereto.

As understood from FIG. 7, each of the contacts 42 has a shape long in the front-rear direction. Each of the contacts 42 has a contact portion 421 which is brough into contact with the meting contact (not shown) corresponding thereto. The contact portion 421 protrudes forward of the main surface 4431 of the partition wall 441 at least in part. As understood from FIGS. 7 and 9, in a plane perpendicular to the front-rear direction, the contact portion 421 of each of the contacts 42 is covered by the covering portion 461. Moreover, in the front-rear direction, a tip of the contact portion 421 of each of the contacts 42 is covered by the covering portion 461.

Figure 13:
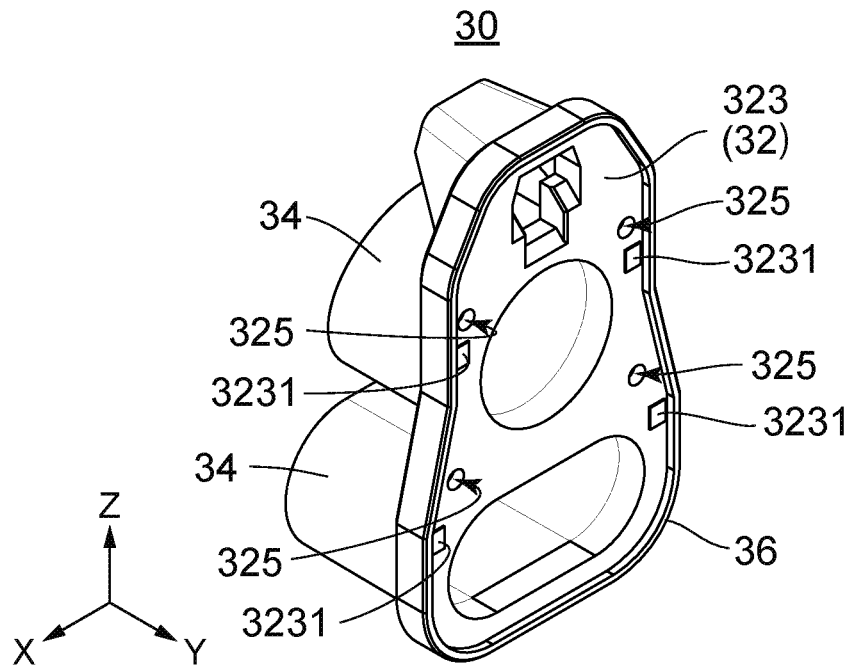
FIG. 13 is a rear, perspective view showing a mating portion included in the charging connector of FIG. 4.
Figure 14:
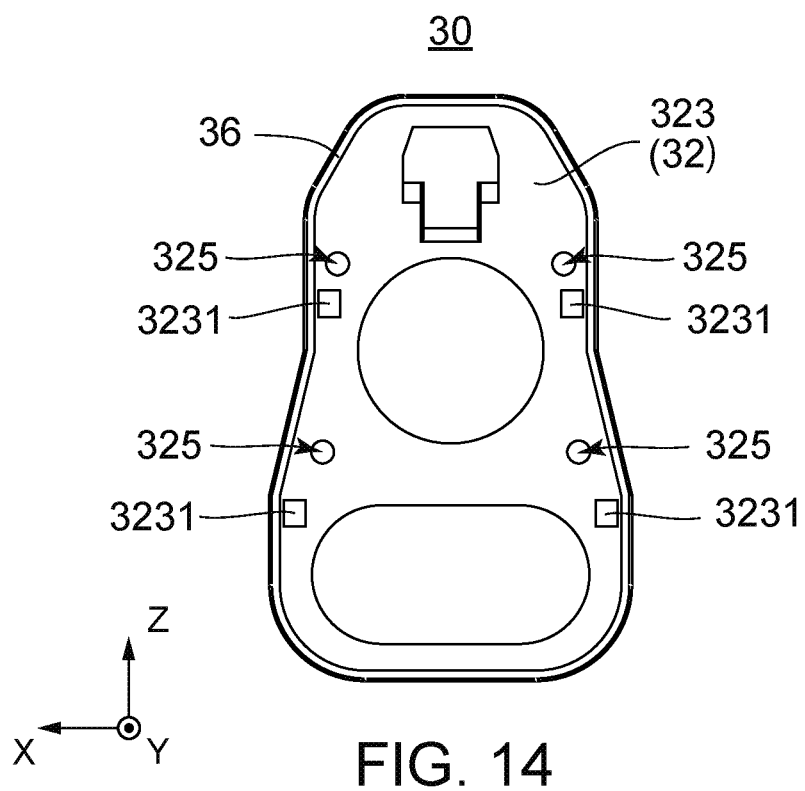
FIG. 14 is a rear view showing the mating portion of FIG. 13.

As shown in FIGS. 2, 13 and 14, the mating portion 30 is provided with a main plate portion 32, a plurality of surrounding portions 34, an edge portion 36, a plurality of first abutment portions 3231 and a plurality of receiving portions 3211. The main plate portion 32 has a front surface 321, which is directed forward in the front-rear direction, and a rear surface (a facing surface) 323, which is directed rearward in the front-rear direction. The main plate portion 32 is formed with a plurality of holes 325 which pierce the main plate portions 32 in the front-rear direction. The holes 325 correspond to the screws 52 of the fastening members 50, respectively. Moreover, the holes 325 correspond to the holes 447 formed in the housing 44, respectively. An internal diameter of each of the holes 325 is larger than the external diameter of the shaft 523 of the screw 52 but is smaller than an external diameter of the head portion 521 of the screw 52. Moreover, the internal diameter of the hole 325 is equal to or smaller than the internal diameter of the hole 447 of the housing 44. The receiving portions 3211 correspond to the holes 325, respectively. Each of the receiving portions 3211 is recessed rearward from the front surface 321 of the main plate portion 32. An internal diameter of the receiving portion 3211 is larger than the internal diameter of the hole 325. Moreover, the internal diameter of the receiving portion 3211 is slightly larger than the external diameter of the head portion 521 of the screw 52 of the fastening member 50.

As shown in FIGS. 2 and 13, the surrounding portions 34 protrude forward from the front surface 321 of the main plate portion 32. As understood from FIGS. 1, 2 and 9, the surrounding portions 34 correspond to the base portions 465 provided to the housing 44, respectively. Then, each of the surrounding portions 34 surrounds and protects the covering portions 461 in a plane perpendicular to the front-rear direction.

As shown in FIGS. 13 and 14, the edge portion 36 extends along an edge of the rear surface 323 of the main plate portion 32 and protrudes rearward. Each of the first abutment portions 3231 is provided to the rear surface 323 of the main plate portion 32 and located near the edge portion 36. In the present embodiment, the first abutment portions 3231 are four in number. However, the present invention is not limited thereto. The number of the first abutment portions 3231 should be three at least. In the present embodiment, the first abutment portions 3231 are protrusions which slightly protrude from the rear surface 323. As described later, the first abutment portions 3231 are respectively brought into contact with the second abutment portions 2011 provided to the body 20.

As understood from FIGS. 2, 4 and 7, when the housing 44 is held by the body 20, the rear portion 445 of the partition wall 441 of the housing 44 is located rearward of the elongated protrusion portions 201 of the body 20 and located forward of the nut holding portions 204 of the body 20. In the front-rear direction, the main surface 4431 of the partition wall 441 is in a position identical to or rearward of that of front surfaces of the elongated protrusion portions 201 of the body 20.

As shown in FIG. 12, the housing 44 has first contact portions 4453 directed rearward. Moreover, as shown in FIG. 5, the body 20 has second contact portions 2041 directed forward. When the housing 44 is held by the body 20, the first contact portions 4453 and the second contact portions 2041 are brought into contact with each other. With this structure, rearward movement of the housing 44 with respect to the body 20 is regulated. In other words, the first contact portions 4453 and the second contact portions 2041 position the housing 44 with respect to the body 20 in the front-rear direction. In the present embodiment, the second contact portions 2041 are protrusions which protrude forward from front surfaces of the nut holding portions 204. Moreover, the first contact portions 4453 are sections which are parts of the rear surface 4451 of the partition wall 441 and face the second contact portions 2041 in the front-rear direction. However, the present invention is not limited thereto. The first contact portions 4453 may be protrusions which protrude rearward in the front-rear direction. In that case, the second contact portions 2041 may be protrusions or may be parts of the front surfaces of the nut holding portions 204. At any rate, it is preferable that the first contact portions 4453 or the second contact portions 2041 or both are protrusions. This is to facilitate adjustment of an inclination of the housing 44 with respect to the body 20.

Figure 8:
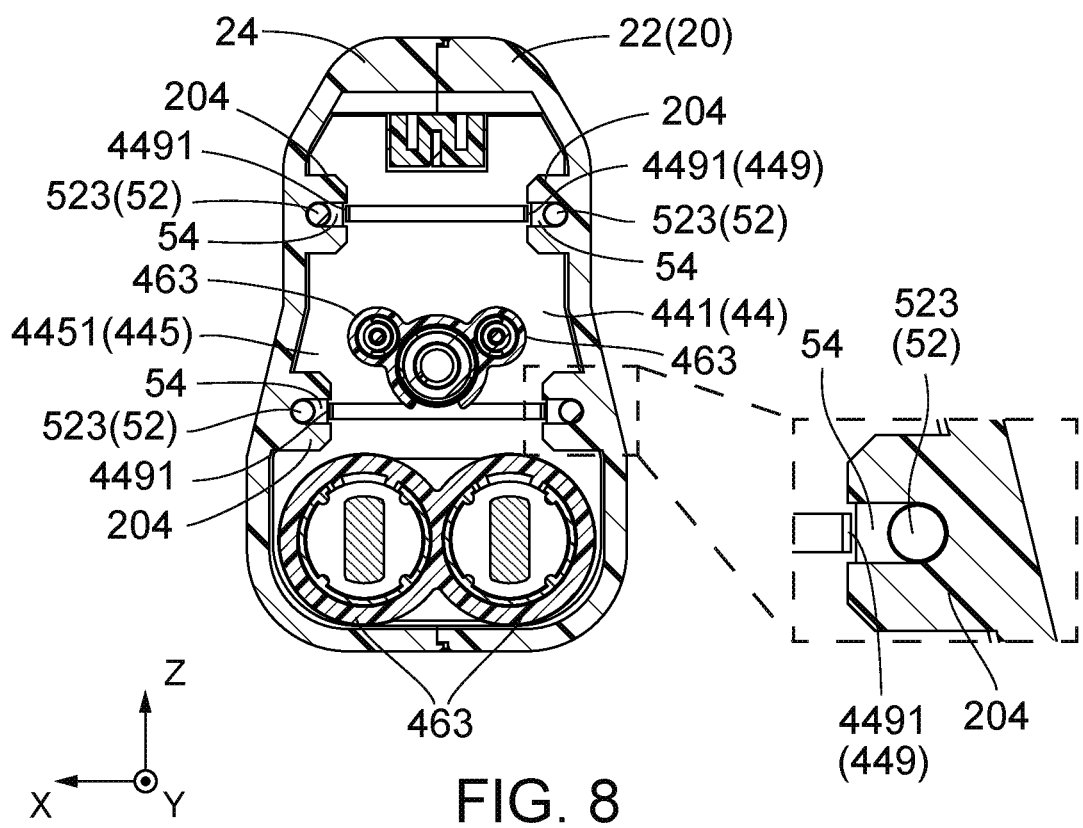
FIG. 8 is a cross-sectional view showing the charging connector of FIG. 6, taken along line C-C.

As understood from FIG. 8, before the housing 44 is held by the body 20, the nuts 54 are press-fit into the nut accommodation portions of the nut holding portions 204 of the body 20, respectively. When the housing 44 is held by the body 20, a side surface of each of the nuts 54 held by the nut holding portions 204 faces the housing 44 but is apart from the housing 44. In detail, the side surface of the nut 54 faces the side surface 4491 of the falling prevention portion 449 of the housing 44 but is apart from the side surface 4491. With this structure, the nuts 54 are prevented from falling away from the nut holding portions 204.

As understood from FIGS. 1 and 2, the mating portion 30 is attached to the body 20 and to the main portion 40 from the front of them. At this time, as understood from FIGS. 2 and 7, the elongated protrusion portions 201 of the body 20 are located inward of the edge portion 36 of the mating portion 30 in a plane perpendicular to the front-rear direction.

As shown in FIGS. 2 and 5, the body 20 is provided with the second abutment portions 2011 directed forward in the front-rear direction. When the mating portion 30 is attached to the body 20, the first abutment portions 3231 (see FIGS. 13 and 14) of the mating portion 30 are brought into contact with the second abutment portions 2011. With this structure, positioning of the mating portion 30 with respect to the body 20 is carried out. In the present embodiment, the second abutment portions 2011 are sections which are parts of the front surfaces of the elongated protrusion portions 201 of the body 20 and face the first abutment portions 3231 in the front-rear direction. However, the preset invention is not limited thereto. The second abutment portions 2011 may protrusions protruding forward from the front surfaces of the elongated protrusion portions 201. In that case, the first abutment portions 3231 may be protrusions or may be parts of the rear surface 323 of the main plate portion 32 of the mating portion 30. At any rate, the first abutment portions 3231 or the second abutment portions 2011 should protrude in the front-rear direction. When the first abutment portions 3231 or the second abutment portions 2011 or both protrude in the front-rear direction, the rear surface 323 of the mating portion 30 and the main surface 4431 of the housing 44 face each other but are apart from each other in the front-rear direction. In other words, in a state that the mating portion 30 is fastened to the body 20, the housing 44 are not in direct contact with the mating portion 30.

As understood from FIGS. 2 to 4, the fastening members 50 fasten the mating portion 30 to the body 20. At this time, the head portion 521 of the screw 52 of the fastening member 50 is received by the receiving portion 3211 of the mating portion 30. Accordingly, the head portion 521 of the screw 52 is not in direct contact with the housing 44. Moreover, the internal diameter of the hole 447 of the housing 44 is larger than the external diameter of the shaft 523 of the screw 52. Accordingly, the shaft 523 of the screw 52 is not in direct contact with the housing 44 normally. In other words, the housing 44 is located apart from the shaft 523 normally. Even in a case where the shaft 523 is brought into contact with the housing 44, when viewed along the front-rear direction, the shaft 523 is only inscribed in an inner wall of the hole 447, and a space is left between the shaft 523 and the hole 447. Furthermore, the nuts 54 are held by the body 20 but apart from the falling prevention portions 449. Accordingly, the nuts 54 are not in direct contact with the housing 44. Thus, the fastening members 50 fasten the mating portion 30 to the body 20 without contact with the housing 44 at least in the front-rear direction. With this structure, in a case where the charging connector 10 is dropped accidentally, direct transmission of impact received by the body 20 or the mating portion 30 to the housing 44 can be prevented or suppressed. As a result, damage of the main portion 40, or damage of the housing 44 and the contacts 42, due to a drop of the charging connector 10 can be prevented.

Second Embodiment

Figure 15:
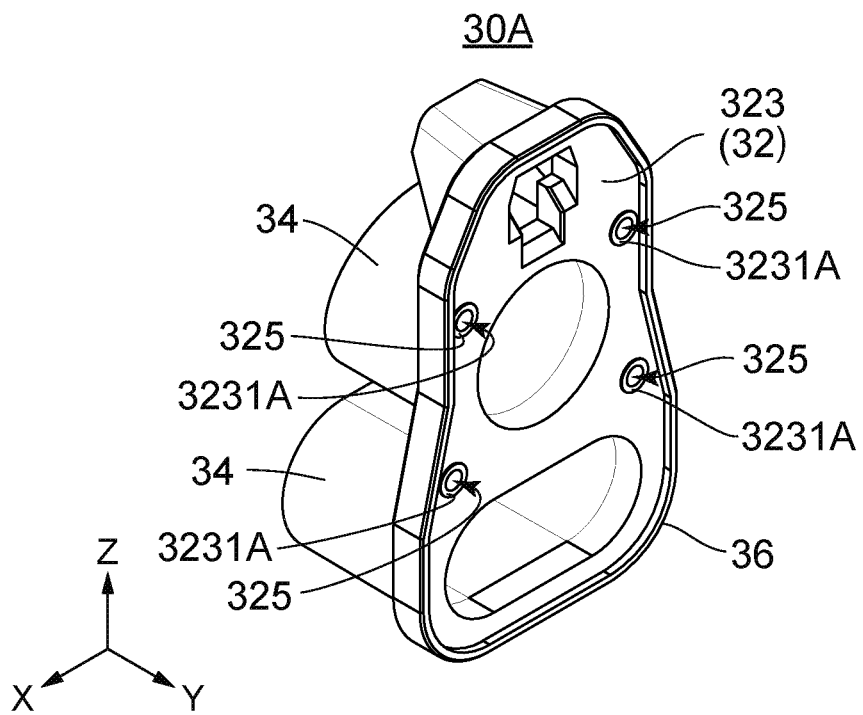
FIG. 15 a rear, perspective view showing a mating portion included in a charging connector according to a second embodiment of the present invention.
Figure 16:
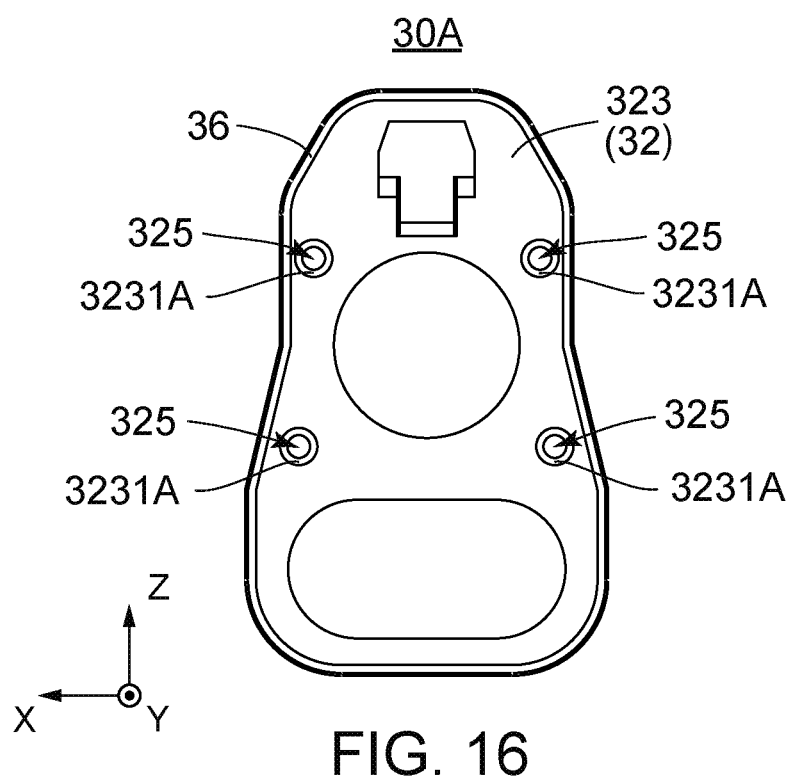
FIG. 16 is a rear view showing the mating portion of FIG. 15.
Figure 17:
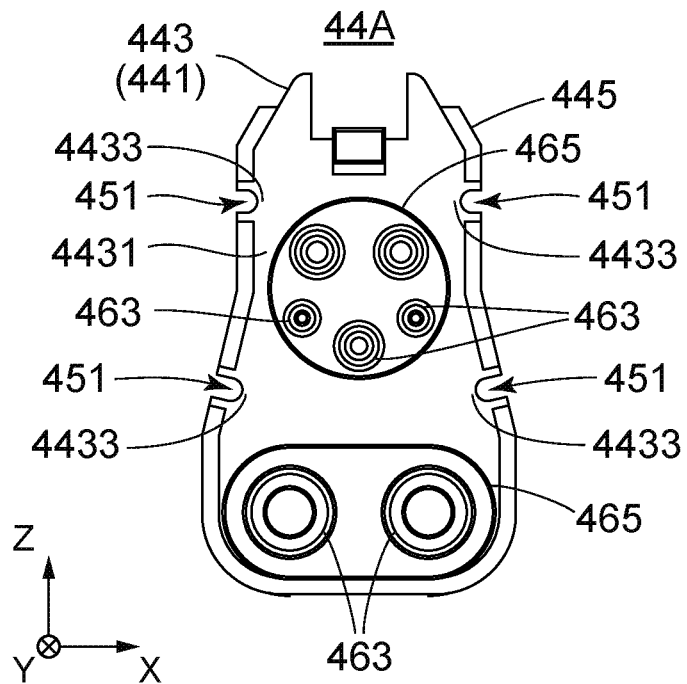
FIG. 17 is a front view showing a housing included in a main portion of the charging connector according to the second embodiment of the present invention.
Figure 18:
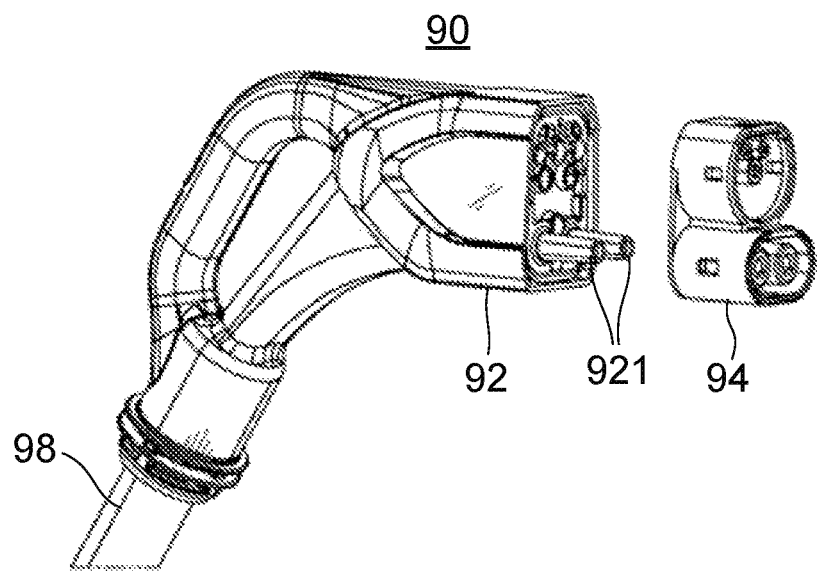
FIG. 18 is an exploded, perspective view showing a charging connector disclosed in Paten document 1.

A charging connector according to a second embodiment of the present invention has a mating portion 30A shown in FIGS. 15 and 16 in place of the mating portion 30 and a housing 44A shown in FIG. 17 in place of the housing 44. Except for the mating portion 30A and the housing 44A, the charging connector of the present embodiment is identical to the charging connector 10 of the first embodiment. Accordingly, hereinafter, the description will be made about the mating portion 30A and the housing 44A.

As shown in FIGS. 15 and 16, the mating portion 30A has a plurality of first abutment portions 3231A which protrude rearward from a rear surface 323 of a main plate portion 32. The first abutment portions 3231A correspond to holes 325, respectively. When viewed along the front-rear direction, a shape of each of the first abutment portions 3231A is an annular shape surrounding the hole 325 corresponding thereto.

As shown in FIG. 17, a partition wall 441 of the housing 44A has a main surface 4431 directed forward in the front-rear direction. On the main surface 4431, a plurality of second abutment portions 4433 is provided. The second abutment portions 4433 are sections which are parts of the main surface 4431 and correspond to the first abutment portions 3231A of the mating portion 30A, respectively. Moreover, the housing 44A has a plurality of recess portions 451 provided to be adjacent to the second abutment portions 4433, respectively. The recess portions 451 are vacant areas of the partition wall 441 in a plane perpendicular to the front-rear direction. The recess portions 451 are substitutes for the holes 447 of the housing 44. A size of each of the recess portions 451 is set so that the housing 44A is apart from shafts 523 of screws 52 when the mating portion 30A is attached to a body 20 (see FIG. 2) by using fastening members 50. With this structure, the fastening members 50 can fasten the mating portion 30A to the body 20 through the recess portions 451 without contact with the housing 44A.

As understood from FIGS. 15 to 17, the first abutment portions 3231A of the mating portion 30A correspond to the second abutment portions 4433 of the housing 44A, respectively. When the housing 44A is held by the body 20 (see FIG. 2) and the mating portion 30A is fastened to the body 20 with the fastening members 50 (see FIG. 2), each of the first abutment portions 3231A and the second abutment portion 4433 corresponding thereto are brought into contact with each other. With this structure, in the front-rear direction, positioning of the mating portion 30 with respect to the body 20 is carried out. Moreover, the main surface 4431 of the housing 44A faces a rear surface 323 of the mating portion 30A but is apart from the rear surface 323.

According to the present embodiment, the mating portion 30A and the housing 44A are directly brought into contact with each other. Accordingly, accuracy of positioning of the mating portion 30A with respect to the housing 44A can be higher than that of the charging connector 10. On the other hand, a possibility that an impact to the mating portion 30A is transmitted to the housing 44A is increased. According to this structure, however, the impact transmitted from the mating portion 30A to the housing 44A has a direction along the front-rear direction mainly. Accordingly, a possibility that the housing 44A is damaged when the charging connector 10 is dropped is about the same degree as that when the charging connector 10 according to the first embodiment is dropped. In other words, damage of the main portion 40, or damage of the housing 44A and the contacts 42, due to a drop of the charging connector 10 can be prevented satisfactorily.

Although the specific explanation about the present invention is made above with reference to the embodiments, the present invention is not limited thereto but susceptible of various modifications and alternative forms without departing from the spirit of the invention. For example, in the charging connector 10 according to the first embodiment, the mating portion 30A of the second embodiment may be used in place of the mating portion 30. In this case, the housing 44 is provided with the second abutment portions 4433 in place of the second abutment portions 2011 of the body 20.

Moreover, in the charging connector 10 according to the first embodiment, the housing 44A may be used in place of the housing 44. In this case, the second abutment portions 4433 of the housing 44A is unnecessary.

While there has been described what is believed to be the preferred embodiment of the invention, those skilled in the art will recognize that other and further modifications may be made thereto without departing from the spirit of the invention, and it is intended to claim all such embodiments that fall within the true scope of the invention.

What is claimed is:

1. A charging connector comprises a mating portion, a main portion, a body and a fastening member, wherein:
the main portion comprises a plurality of contacts, which are respectively connectable to mating contacts of a mating connector, and a housing, which holds the contacts;

the body accommodates the main portion at least in part and holds the main portion;

the mating portion is located forward of the body in a front-rear direction;

the fastening member fastens the mating portion to the body;

the fastening member is not in contact with the housing at least in the front-rear direction;

the fastening member is provided with a screw and a nut;

the screw has a shaft portion and a head portion;

the mating portion has a receiving portion which receives the head portion;

the body has a holding portion which holds the nut; and the housing is located to be apart from the shaft portion.

2. The charging connector as recited in claim 1, wherein:

the housing has a main surface, which is directed forward in the front-rear direction, and a plurality of covering portions, which protrude forward from the main surface;

each of the contacts has a contact portion which protrudes forward of the main surface in part;

the contact portions of the contacts are covered by the covering portions, respectively; and the mating portion has a surrounding portion surrounds the plurality of the covering portions in a plane perpendicular to the front-rear direction.

3. The charging connector as recited in claim 1, wherein:

the mating portion has a facing surface, which is directed rearward in the front-rear direction, and a first abutment portion, which is provided on the facing surface;

the housing has a main surface, which is directed forward in the front-rear direction, a second abutment portion, which is provided on the main surface, and a recess portion, which is provided to be adjacent to the second abutment portion;

the main surface faces the facing surface but is apart from the facing surface in the front-rear direction;

the first abutment portion abuts on the second abutment portion;

the recess portion is a lack area in a plane perpendicular to the front-rear direction; and the fastening member fastens the mating portion to the body through the recess portion without contact with the housing.

4. The charging connector as recited in claim 3, wherein at least one of the first abutment portion and the second abutment portion protrudes in the front-rear direction.

5. The charging connector as recited in claim 1, wherein:

the mating portion has a facing surface, which is directed rearward in the front-rear direction, and a first abutment portion, which is provided on the facing surface;

the housing has a main surface directed forward in the front-rear direction;

the main surface faces the facing surface but is apart from the facing surface in the front-rear direction;

the body is provided with a second abutment portion directed forward; and the first abutment portion abuts on the second abutment portion.

6. The charging connector as recited in claim 1, wherein:

the nut is a square nut; and the nut is press-fit into the holding portion of the body.

7. The charging connector as recited in claim 6, wherein:

the square nut is accommodated in the holding portion; and a side surface of the square nut faces the housing but is apart from the housing.

8. The charging connector as recited in claim 1, wherein:

the housing has a first contact portion;

the body has a second contact portion;

the first contact portion and the second contact portion are in contact with each other; and at least one of the first contact portion and the second portion is a protrusion.

* * * * *